United States Patent
Park et al.

(10) Patent No.: US 8,837,191 B2
(45) Date of Patent: Sep. 16, 2014

(54) SEMICONDUCTOR APPARATUS

(75) Inventors: Heat Bit Park, Ichon-si (KR); Kang Seol Lee, Ichon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 356 days.

(21) Appl. No.: 13/167,963

(22) Filed: Jun. 24, 2011

(65) Prior Publication Data

US 2012/0212990 A1     Aug. 23, 2012

(30) Foreign Application Priority Data

Feb. 22, 2011 (KR) .......................... 10-2011-0015625

(51) Int. Cl.
*G11C 5/06* (2006.01)

(52) U.S. Cl.
USPC ........... 365/63; 365/51; 365/198; 365/230.03

(58) Field of Classification Search
USPC ................................ 365/63, 51, 198, 230.03
See application file for complete search history.

(56) References Cited

U.S. PATENT DOCUMENTS

| | | | | |
|---|---|---|---|---|
| 8,031,505 B2* | 10/2011 | Kang et al. | ...................... | 365/51 |
| 2011/0026293 A1* | 2/2011 | Riho | ............................... | 365/63 |
| 2011/0090004 A1* | 4/2011 | Schuetz | ........................ | 327/564 |
| 2011/0188331 A1* | 8/2011 | Jin et al. | ........................ | 365/193 |

FOREIGN PATENT DOCUMENTS

KR     1020100133192 A     12/2010

* cited by examiner

*Primary Examiner* — Toan Le

(74) *Attorney, Agent, or Firm* — William Park & Associates Patent Ltd.

(57) ABSTRACT

A semiconductor apparatus includes a multi-chip module which multi-chip module comprises a first and a second chips. The semiconductor apparatus comprises a first data line in the first chip to carry first read data; a first controller, in the first chip, configured to generate first output data on a first output data line in the first chip based on the first read data transmitted from the first data line; a first data transmitter configured to electrically connect the first output data line to the second chip.

19 Claims, 5 Drawing Sheets

SEMICONDUCTOR APPARATUS

CROSS-REFERENCES TO RELATED APPLICATION

The present application claims priority under 35 U.S.C. §119(a) to Korean Application No. 10-2011-0015625, filed on Feb. 22, 2011, in the Korean Intellectual Property Office, which is incorporated herein by reference in its entirety as if set forth in full.

BACKGROUND

1. Technical Field

Various embodiments of the present invention relate to a semiconductor apparatuses. In particular, certain embodiments relate to a three-dimensional (3D) semiconductor apparatus including a plurality of chips stacked therein.

2. Related Art

In an effort to increase the degree of integration of a semiconductor apparatus, there has been developed a three-dimensional semiconductor apparatus in which a plurality of chips are stacked and packaged. Because two or more chips are stacked therein, the 3D semiconductor apparatus can achieve a maximum degree of integration in the same space.

Various schemes exist to implement the three-dimensional semiconductor apparatus. Among them, a scheme exists in which a plurality of chips with the same structure are stacked and the stacked chips are coupled to one another using wires such as metal lines, so that they operate as a single semiconductor apparatus.

Also, recently, a TSV (through-silicon via) type semiconductor apparatus has been disclosed in the art, in which silicon vias are formed through a plurality of stacked chips so that all the chips are electrically connected to one another. Since the chips are electrically connected to one another through the silicon vias vertically passing through the chips in the TSV type semiconductor apparatus, it is possible to efficiently reduce the size of a package, as compared with a semiconductor apparatus in which respective chips are electrically connected to one another through bonding wirings provided around the edges of the chips. However, the TSV connections require through holes in the chips, a layout margin of a chip is reduced as the number of the TSVs is increased.

FIG. 1 is a diagram schematically illustrating a typical configuration of a semiconductor apparatus. In FIG. 1, a semiconductor apparatus 10 has a structure in which two chips Master and Slave are electrically connected to each other through TSVs 11. In general, since a three-dimensional semiconductor apparatus communicates with other apparatuses through a chip operating as a master chip, the second chip Slave transmits data stored in a memory cell block 12 through the TSVs 11, and the data is output to a pad 15 through a read control unit 13 of the first chip Master. The second chip Slave receives data through the pad 15 and a write control unit 14 of the first chip Master, and the TSVs 11, and stores the received data in the memory cell block 12. In this regard, the TSVs 11 electrically connect data input/output lines GIO1<0:n> of the first chip Master to data input/output lines GIO2<0:n> of the second chip Slave. However, in such a case, the number of the TSVs 11 increases because of the large number of the data input/output lines GIO1<0:n> and GIO2<0:n>. The semiconductor apparatus receives serial data, converts the serial data to parallel data, and stores the parallel data in a set of memory cells, or converts the parallel data to serial data and outputs the serial data through the pad. Therefore, the number of the data input/output lines for transmitting the parallel data, for example, may be 64, 128, 256 or more. As a consequence, the number of the TSVs for connecting the data input/output lines together also increases because of the large number of the data input/output lines. Due to the increased TSVs, it may be difficult to sufficiently ensure a chip fabrication area.

FIG. 2 is a diagram illustrating another typical configuration of a semiconductor apparatus. In FIG. 2, two chips Master and Slave constituting a semiconductor apparatus 20 are illustrated to have the same structure, unlike that of FIG. 1. That is, the semiconductor apparatus 20 has a configuration in which data input/output lines GIO1<0:n> and GIO2<0:n> are not electrically interconnected respectively through TSVs 21, but instead pads 22 and 23 are electrically connected to each other through the TSVs 21. Therefore, the number of the required TSVs 21 corresponds to the number of the pads 22 and 23. In general, since the number of the pads 22 and 23 is smaller than the number of the data input/output lines GIO1<0:n> and GIO2<0:n>, the semiconductor apparatus 20 requires a smaller number of TSVs as compared with the semiconductor apparatus 10 illustrated in FIG. 1. However, the configuration of the semiconductor apparatus 20 makes it very difficult to adjust the timing of the output data and the amount of current consumption increases. That is, since various data signals in each chip travel different lengths of paths, skew may occur at the output timing of the data. Furthermore, since the load seen from the TSVs 21 is very large, the consumed amount of current for driving data transmitted on the TSVs 21 may increase.

SUMMARY

Accordingly, there is a need for an improved semiconductor apparatus capable of improving the operation performance thereof while reducing the number of TSVs.

To attain the advantages and in accordance with the purposes of the invention, as embodied and broadly described herein, one exemplary aspect of the present invention may provide a semiconductor apparatus including a mufti-chip module, the multi-chip module including a first and a second chips, comprising: a first data line in the first chip to carry first read data; a first controller, in the first chip, configured to generate first output data on a first output data line in the first chip based on the first read data transmitted from the first data line; a first data transmitter configured to electrically connect the first output data line to the second chip.

In another exemplary aspect of the present invention, a semiconductor apparatus may comprise: a first chip data input/output line; a first chip write control unit configured to receive data input through a pad to generate first chip input data, and transmit the first chip input data to the first chip data input/output line; and a write data transmission unit configured to electrically connect a first chip to a second chip between the pad and the first chip write control unit, and transmit the data input through the pad to the second chip.

In another exemplary aspect of the present invention, a semiconductor apparatus may comprise: a first chip write control unit configured to receive data input through a pad to generate first chip input data, and transmit the first chip input data to a first chip data input/output line; a first chip read control unit configured to receive data transmitted from the first chip data input/output line to generate first chip output data; a second chip write control unit configured to receive the data input through the pad to generate second chip input data, and transmit the second chip input data to a second chip data input/output line; a second chip read control unit configured to receive data transmitted from the second chip data input/output line to generate second chip output data; a write data transmission unit configured to electrically connect the pad, the first chip write control unit, and the second chip write control unit to one another; and a read data transmission unit configured to electrically connect the pad, the first chip read control unit, and the second chip read control unit to one another.

In another exemplary aspect of the present invention, a semiconductor apparatus may comprise: a first chip read control unit configured to generate first chip output data based on data stored in a memory cell of a first chip; a first chip pad configured to be coupled to the first chip read control unit and output the first chip output data; a read data transmission unit configured to be coupled to the first chip read control unit and the first chip pad and transmit the first chip output data to a second chip; and a first chip pad control unit configured to control whether to activate the first chip pad in response to chip information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments consistent with the invention and, together with the description, serve to explain the principles of the invention.

DETAILED DESCRIPTION

Figure 1:
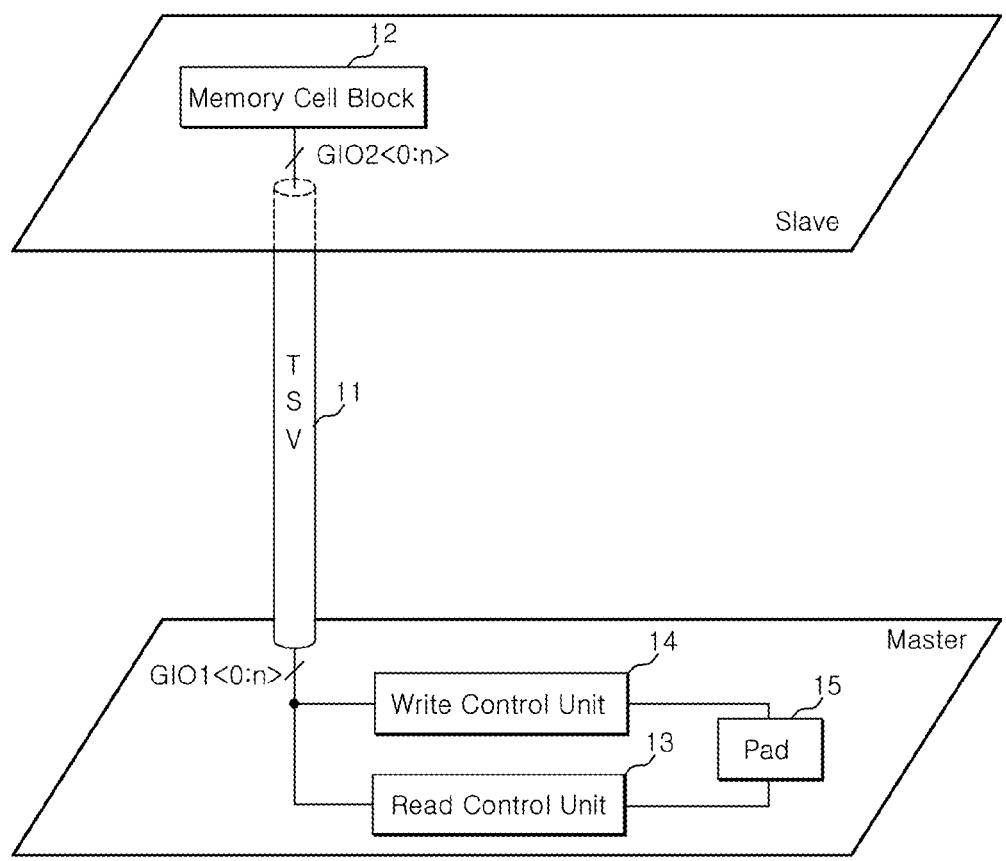
FIG. 1 is a diagram schematically illustrating a typical configuration of a semiconductor apparatus.
Figure 2:
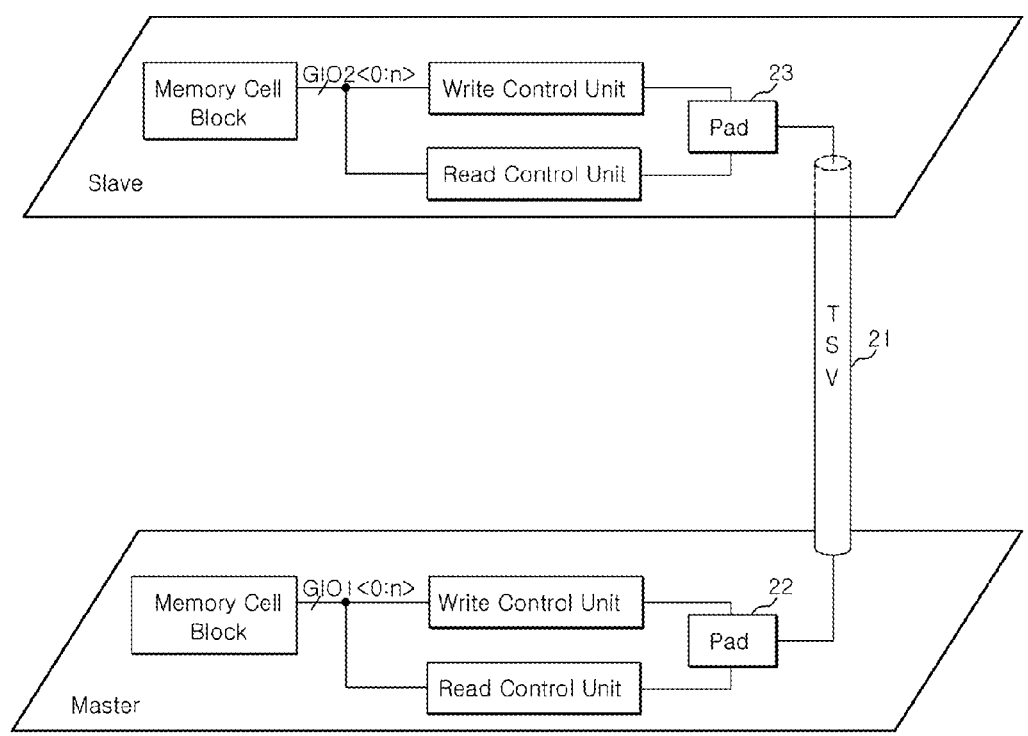
FIG. 2 is a diagram schematically illustrating another typical configuration of a semiconductor apparatus.

Reference will now be made in detail to the exemplary embodiments consistent with the present disclosure, examples of which are illustrated in the accompanying drawings. Wherever possible, the same reference characters will be used throughout the drawings to refer to the same or like parts.

Figure 3:
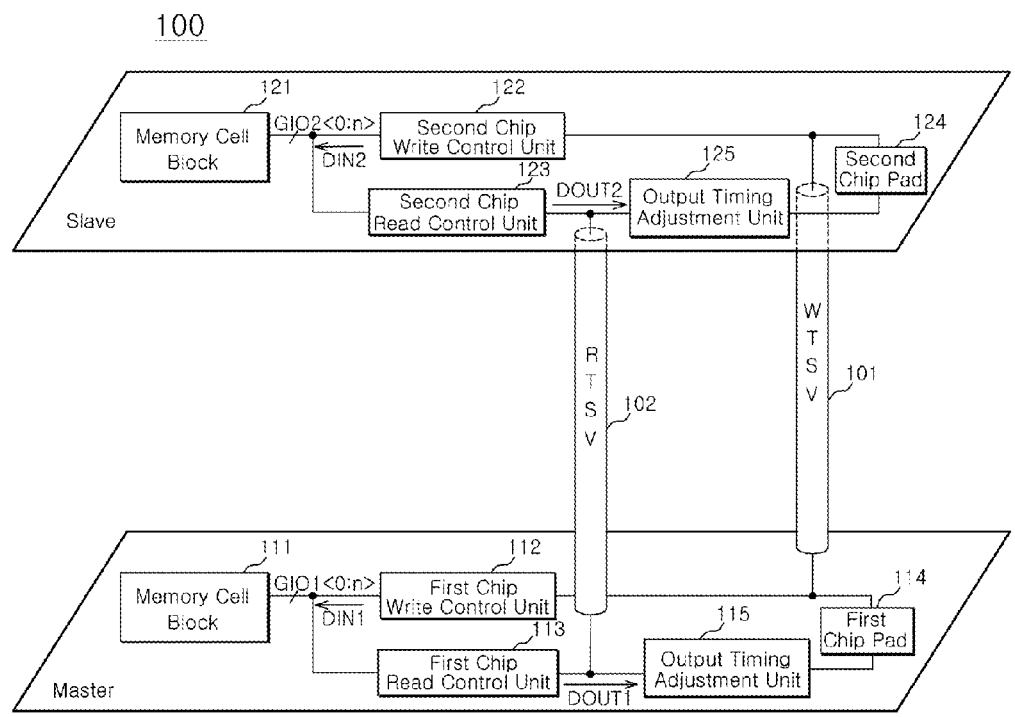
FIG. 3 is a diagram schematically illustrating the configuration of a semiconductor apparatus according to an embodiment of the present invention.

FIG. 3 is a diagram schematically illustrating the configuration of a semiconductor apparatus according to an exemplary embodiment of the present invention. In FIG. 3, the semiconductor apparatus 100 is exemplarily shown to include a master chip Master and a slave chip Slave, wherein the master chip Master and the slave chip Slave are stacked to form a single semiconductor apparatus, and are electrically connected to each other through TSVs. In the exemplary embodiment, for the purpose of convenience, two chips are shown to be stacked as illustrated in FIG. 3. However, more than two slave chips may be stacked to form a single semiconductor apparatus. In FIG. 3, the slave chip Slave and the master chip Master have the same configuration. However, the invention is not limited thereto. For example, the configuration of the chips may vary depending on applications except for essential elements for the invention. The semiconductor apparatus 100 is configured to communicate externally through a first chip pad 114 of the master chip Master.

As an illustrative example, the master chip Master is illustrated to include a memory cell block 111, a first chip write control unit 112, a first chip read control unit 113, and a first chip pad 114. Similarly thereto, the slave chip Slave is illustrated to include a memory cell block 121, a second chip write control unit 122, a second chip read control unit 123, and a second chip pad 124.

In the exemplary example, the master chip Master and the slave chip Slave are electrically connected to each other through a write data transmission unit (WTSV) 101 and a read data transmission unit (RTSV) 102. The write data transmission unit 101 electrically connects a data line between the first chip write control unit 112 and the first chip pad 114 to a data line between the second chip write control unit 122 and the second chip pad 124. The read data transmission unit 102 electrically connects a data line between the first chip read control unit 113 and the first chip pad 114 to a data line between the second chip read control unit 123 and the second chip pad 124. Thus, in the semiconductor apparatus according to the embodiment, the first chip pad 114 and the second chip pad 124 are not electrically connected to each other. Instead, the electrical connection is prior to first and second chips 114 and 124, unlike the typical configuration. Furthermore, since each of the semiconductor apparatus independently includes the write data transmission unit 101 and the read data transmission unit 102, a transmission path of data to be stored is set independently from a transmission path of data to be output. With such a configuration, data transmission in a write operation and data transmission in a read operation are performed by independent transmission units, so that it is possible to accurately perform the write operation and the read operation at a high speed.

In the exemplary embodiment, the write data transmission unit 101 and the read data transmission unit 102 are illustrated as Through-Silicon Vias (TSVs). However, the invention is not limited thereto. The write data transmission unit 101 and the read data transmission unit 102 exemplarily include one or more TSVs, respectively. When the write data transmission unit 101 and the read data transmission unit 102 include two or more TSVs, it is possible to accurately transmit data at a high speed in the write operation and the read operation.

The first chip write control unit 112 is configured to generate first chip input data DIN1 based on data which is input from the first chip pad 114, and transmit the first chip input data DIN1 to first data input/output lines GIO1<0:n>. The transmitted data is stored in the memory cell block 111. The data which is input through the first chip pad 114 is serial data and the first chip input data DIN1 is parallel data. Thus, the number of lines for connecting the first chip write control unit 112 to the first chip pad 114 is very smaller than that of the first data input/output lines GIO1<0:n>. Consequently, in the semiconductor apparatus 100 according to the embodiment, it is possible to reduce the number of TSVs for an electrical connection between chips, as compared with the typical semiconductor apparatus 10 illustrated in FIG. 1.

Meanwhile, the data stored in the memory cell block 111 may be transmitted to the first chip read control unit 113 through the first data input/output lines GIO1<0:n>, and the first chip read control unit 113 is configured to generate first chip output data DOUT1 based on the data transmitted on the first data input/output lines GIO1<0:n>. The data transmitted on the first data input/output lines GIO1<0:n> is parallel data and the first chip output data DOUT1 is serial data.

In certain instances, the second chip write control unit 122 provided in the slave chip Slave does not receive data from the second chip pad 124 but through the write data transmission unit 101. The second chip write control unit 122 is configured to receive data transmitted through the first chip pad 114 and the write data transmission unit 101. The second chip write control unit 122 is configured to generate second chip input data DIN2 based on the data transmitted from the write data transmission unit 101, and output the second chip input data DIN2 to second data input/output lines GIO2<0:n>. The second chip input data DIN2 transmitted on the second data input/output lines GIO2<0:n> is stored in the memory cell block 121. The data transmitted through the first chip pad 114 and the second chip write control unit 122 is serial data and the second chip input data DIN2 is parallel data.

Meanwhile, the data stored in the memory cell block 121 is transmitted to the second chip read control unit 123 on the second data input/output lines GIO2<0:n>. The second chip read control unit 123 is configured to generate second chip output data DOUT2 based on the data transmitted on the second data input/output lines GIO2<0:n>. In certain instances, the second chip output data DOUT2 is not transmitted to the master chip Master through the second chip pad 124 but through the read data transmission unit 102. The second chip output data DOUT2 may be transmitted to the master chip Master through the read data transmission unit 102, and output externally through the first chip pad 114. The data transmitted on the second data input/output lines GIO2<0:n> is parallel data and the second chip output data DOUT2 is parallel data.

In FIG. 3, the semiconductor apparatus 100 according to the exemplary embodiment is illustrated to additionally include output timing adjustment units 115 and 125. In FIG. 3, since the semiconductor apparatus 100 is shown to include two chips having the same structure, the output timing adjustment unit 115 is provided in the master chip Master and the output timing adjustment unit 125 is provided in the slave chip Slave. However, the output timing adjustment units 115 and 125 may be provided only in the master chip Master. The output timing adjustment unit 115 is configured to allow the output timing of the first chip output data DOUT1 to substantially match the output timing of the second chip output data DOUT2. That is, the output timing adjustment unit 115 is configured to allow the time from the start of a read operation to the output of the first chip output data DOUT1 to substantially match the time from the start of the read operation to the output of the second chip output data DOUT2. In FIG. 3, since the length of a path through which the first chip output data DOUT1 generated by the master chip Master is transmitted to the first chip pad 114 is shorter than the length of a path through which the second chip output data DOUT2 generated by the slave chip Slave is transmitted to the first chip pad 114, skew may occur between the time at which the first chip output data DOUT1 reaches the first chip pad 114 and the time at which the second chip output data DOUT2 reaches the first chip pad 114 after the start of the read operation. In this regard, the output timing adjustment unit 115 may be provided to compensate for the skew. The output timing adjustment unit 115 may include a delay circuit. In the exemplary embodiment, the output timing adjustment unit 115 performs an operation of allowing the first chip output data DOUT1 to be delayed as much as the second chip output data DOUT2, so that it is possible to allow the first chip output data DOUT1 reaches the first chip pad 114 at the substantially same time as when the second chip output data DOUT2 reaches the first chip pad 114.

Figure 4:
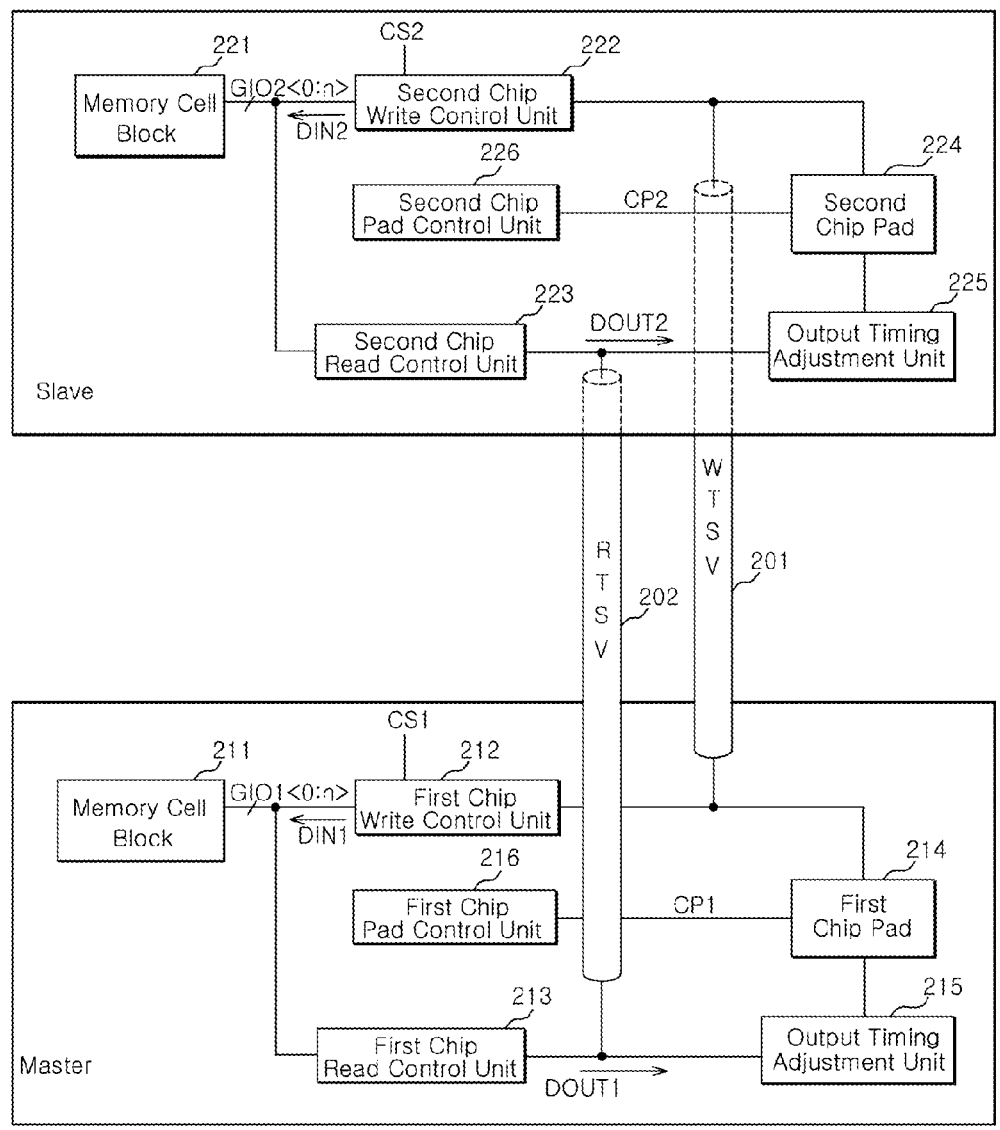
FIG. 4 is a diagram schematically illustrating the configuration of a semiconductor apparatus according to another embodiment of the present invention.

FIG. 4 is a diagram schematically illustrating the configuration of a semiconductor apparatus according to another exemplary embodiment. In FIG. 4, a semiconductor apparatus 200 is shown to additionally include first and second chip pad control units 216 and 226 in addition to the elements of the semiconductor apparatus 100 illustrated in FIG. 3. Furthermore, first and second chip write control units 212 and 222 are configured to be controlled by first and second chip select signals CS1 and CS2, respectively. The first and second chip pad control units 216 and 226 are configured to determine whether to activate first and second chip pads 214 and 224 based on chip information, respectively. The chip information is used to designate a master chip and a slave chip among a plurality of chips. For example, since the first chip pad control unit 216 is provided in the master chip Master, the first chip pad control unit 216 activates the first chip pad 214 based on the chip information designating the master chip. Since the second chip pad control unit 226 is provided in the slave chip Slave, the second chip pad control unit 226 deactivates the second chip pad 224 based on the chip information designating the slave chip. The first and second chip pad control units 216 and 226 are configured to receive corresponding chip information and generate first and second chip pad control signals CP1 and CP2, respectively. The semiconductor apparatus 200 deactivates the second chip pad 224, thereby allowing the second chip output data DOUT2 generated by a second chip read control unit 223 to be transmitted to the master chip Master through a read data transmission unit (RTSV) 202. Furthermore, the semiconductor apparatus 200 activates only the first chip pad 214, thereby allowing the first and second chip output data DOUT1 and DOUT2 to be output through the first chip pad 214.

The first and second chip select signals CS1 and CS2 are a type of a command signal for designating a chip to be operated among the master chip Master and the slave chip Slave, for example, a signal which may be input from a controller. Thus, the first chip write control unit 212 is activated when the first chip select signal CS1 is input, and the second chip write control unit 222 is activated when the second chip select signal CS2 is input. Consequently, although data is received through the first chip pad 214 and a write data transmission unit (WTSV) 201 and transmitted to the first and second chip write control units 212 and 222, only the write control unit activated by the chip select signals CS1 and CS2 can perform a write operation.

Figure 5:
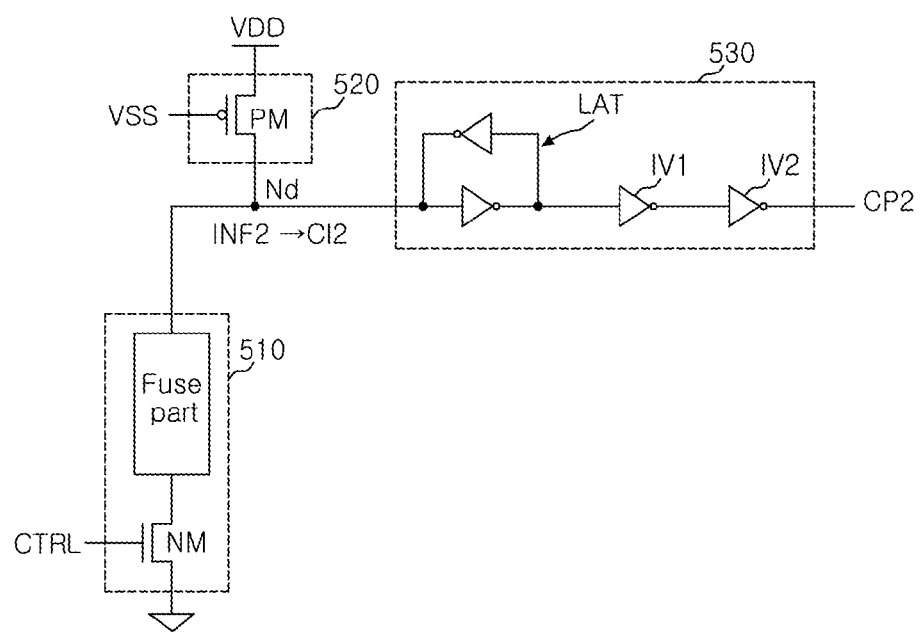
FIG. 5 is a diagram illustrating the configuration of the second chip pad control unit illustrated in FIG. 4 according to an embodiment.

FIG. 5 is a diagram illustrating the configuration of the second chip pad control unit illustrated in FIG. 4 according to the exemplary embodiment. The first chip pad control unit 216 may have the same configuration as that of the second chip pad control unit 226. In FIG. 5, the second chip pad control unit 226 may include a chip information generation section 510, a chip information identification section 520, and a pad control signal generation section 530. The chip information generation section 510 is configured to output chip information INF2 in response to a control signal CTRL. The chip information identification section 520 is configured to receive the chip information INF2 and generate a chip information identification signal CI2. The pad control signal generation section 530 is configured to generate the second chip pad control signal CP2, which determines whether to activate the second chip pad 224, in response to the chip information identification signal CI2.

The chip information generation section 510 may include an NMOS transistor NM and a fuse part. The NMOS transistor NM is turned on and off by the control signal CTRL. The fuse part is coupled to the NMOS transistor NM. The fuse part has chip information through a fuse. For example, when a chip including the pad control unit is the slave chip Slave, the fuse of the fuse part has been cut, and when the chip including the pad control unit is the master chip Master, the fuse of the fuse part may have not been cut. When the fuse of the fuse part has been cut, the chip information generation section 510 outputs no signal to a node Nd. However, when the fuse of the fuse part has not been cut, the chip information generation section 510 may output the chip information INF2 at a low level to the node Nd.

The chip information identification section 520 may include a PMOS transistor PM. The PMOS transistor PM is always turned on by receiving a ground voltage VSS through a gate thereof. The PMOS transistor PM outputs an external voltage VDD to the node Nd in the turned-on state. In the embodiment, the driving force of the PMOS transistor PM is set to be smaller than that of the NMOS transistor NM of the chip information generation section 510. Consequently, when the chip information INF2 is not generated, the chip information identification section 520 may generate the chip information identification signal CI2 at a high level. When the chip information INF2 at a low level is generated, the chip information identification section 520 may generate the chip information identification signal CI2 at a low level.

The pad control signal generation section 530 may include a latch part LAT, and first and second inverters IV1 and IV2. The latch part LAT inverts the chip information identification signal CI2 and stores an inverted chip information identification signal, and the first and second inverters IV1 and IV2 drive the inverted chip information identification signal to generate the second chip pad control signal CP2.

In the embodiment, since the chip including the second chip pad control unit 226 operates as the slave chip Slave, the fuse of the fuse part is cut. Thus, when the control signal CTRL is input, the chip information generation section 510 outputs no signal to the node Nd. Therefore, the chip information identification section 520 generates the chip information identification signal CI2 at a high level and the pad control signal generation section 530 generates a deactivated second chip pad control signal CP2. However, the first chip pad control unit 216 generates an activated first chip pad control signal CP1.

Meanwhile, the control signal CTRL may use any signals related to an activation operation of the semiconductor apparatus 200. For example, the control signal CTRL may be a power-up signal for initializing the semiconductor apparatus, or a bonding signal received through a bonding pad formed in the chip manufacturing process.

The operation of the semiconductor apparatus 200 according to the embodiment will be described with reference to FIGS. 4 and 5 below. First, when the activation operation of the semiconductor apparatus 200 starts, as the control signal CTRL is activated, the first chip pad control unit 216 generates the activated first chip pad control signal CP1 and the second chip pad control unit 226 generates the deactivated second chip pad control signal CP2.

In order to perform a write operation of the master chip Master, when the first chip select signal CS1 is activated and the second chip select signal CS2 is deactivated, the first chip write control unit 212 is activated. Consequently, the first chip write control unit 212 may receive data externally through the first chip pad 214 to generate first chip input data DIN1, and the first chip input data DIN1 may be transmitted on the first data input/output lines GIO1<0:n> and stored in the memory cell block 211. In order to perform a write operation of the slave chip Slave, when the first chip select signal CS1 is deactivated and the second chip select signal CS2 is activated, the second chip write control unit 222 is activated. Consequently, data received through the first chip pad 214 is transmitted to the second chip write control unit 222 through the write data transmission unit 201. The second chip write control unit 222 may receive the transmitted data to generate second chip input data DIN2, and the second chip input data DIN2 may be transmitted on the second data input/output lines GIO2<0:n> and stored in the memory cell block 221.

When a read operation of the master chip Master is performed, the data stored in the memory cell block 211 is transmitted to the first data input/output lines GIO1<0:n>, and a first chip read control unit 213 generates first chip output data DOUT1 from the transmitted data. The first chip output data DOUT1 may be output through the first chip pad 214 after being delayed by an output timing adjustment unit 215 for a predetermined time. When a read operation of the slave chip Slave is performed, the data stored in the memory cell block 221 is transmitted to the second data input/output lines GIO2<0:n>, and a second chip read control unit 223 generates the second chip output data DOUT2 from the transmitted data. The second chip output data DOUT2 may be transmitted to the output timing adjustment unit 215, which is arranged in the master chip Master, through the read data transmission unit 202, and output through the first chip pad 214 after being delayed by the output timing adjustment unit 215.

In the embodiments, two chips have been described as an example. However, it should be noted that the scope of the invention can also be applied to the case in which a single semiconductor apparatus is formed by stacking three or more chips.

While certain embodiments have been described above, it will be understood to those skilled in the art that the embodiments described are by way of example only. Accordingly, the semiconductor apparatus described herein should not be limited based on the described embodiments. Rather, the semiconductor apparatus described herein should only be limited in light of the claims that follow when taken in conjunction with the above description and accompanying drawings.

What is claimed is:

1. A semiconductor apparatus comprising:
    a first chip data input/output line;
    a first chip write control unit configured to receive data input through a pad to generate first chip input data, and transmit the first chip input data to the first chip data input/output line; and
    a write data transmission unit configured to electrically connect a first chip to a second chip between the pad and the first chip write control unit, and transmit the data input through the pad to the second chip.

2. The semiconductor apparatus according to claim 1, further comprising:
    a second chip data input/output line; and
    a second chip write control unit configured to generate the second chip input data based on data transmitted from the write data transmission unit, and transmit the second chip input data to the second chip data input/output line.

3. The semiconductor apparatus according to claim 2, wherein the first chip write control unit is configured to be activated in response to a first chip select signal and the second chip write control unit is configured to be activated in response to a second chip select signal.

4. The semiconductor apparatus according to claim 1, wherein the write data transmission unit includes one or more through-silicon vias.

5. The semiconductor apparatus according to claim 1, wherein the data input through the pad is serial data and the first chip input data is parallel data.

6. A semiconductor apparatus comprising:
a first chip write control unit configured to receive data input through a pad to generate first chip input data, and transmit the first chip input data to a first chip data input/output line;
a first chip read control unit configured to receive data transmitted from the first chip data input/output line to generate first chip output data;
a second chip write control unit configured to receive the data input through the pad to generate second chip input data, and transmit the second chip input data to a second chip data input/output line;
a second chip read control unit configured to receive data transmitted from the second chip data input/output line to generate second chip output data;
a write data transmission unit configured to electrically connect the pad, the first chip write control unit, and the second chip write control unit to one another; and
a read data transmission unit configured to electrically connect the pad, the first chip read control unit, and the second chip read control unit to one another.

7. The semiconductor apparatus according to claim 6, further comprising:
an output timing adjustment unit configured to allow time from a start time point of a read operation to an output time point of the first chip output data to substantially coincide with time from the start time point of the read operation to an output time point of the second chip output data.

8. The semiconductor apparatus according to claim 6, wherein the first chip output data and the second chip output data are output through the pad.

9. The semiconductor apparatus according to claim 6, wherein the first chip write control unit is configured to be activated in response to a first chip select signal and the second chip write control unit is configured to be activated in response to a second chip select signal.

10. The semiconductor apparatus according to claim 6, wherein the data received in the first and second chip write control units is serial data, and the first and second input data output from the first and second chip write control units is parallel data.

11. The semiconductor apparatus according to claim 6, wherein the data received in the first and second chip read control units is parallel data, and the first and second output data output from the first and second chip read control units is serial data.

12. A semiconductor apparatus comprising:
a first chip read control unit configured to generate first chip output data based on data stored in a memory cell of a first chip;
a first chip pad configured to be coupled to the first chip read control unit and output the first chip output data;
a read data transmission unit configured to be coupled to the first chip read control unit and the first chip pad and transmit the first chip output data to a second chip; and
a first chip pad control unit configured to control whether to activate the first chip pad in response to chip information.

13. The semiconductor apparatus according to claim 12, wherein the first chip pad control unit is configured to activate the first chip pad according to the chip information when the first chip is a master chip, and deactivate the first chip pad when the first chip is a slave chip.

14. The semiconductor apparatus according to claim 12, wherein the first chip pad control unit comprises:
a chip information generation section configured to generate the chip information in response to a control signal;
a chip information identification section configured to receive the chip information to generate a chip information identification signal; and
a pad control signal generation section configured to generate a first pad control signal for controlling whether to activate the first chip pad in response to the chip information identification signal.

15. The semiconductor apparatus according to claim 14, wherein the control signal includes one or more of a power-up signal and a bonding signal of the semiconductor apparatus.

16. The semiconductor apparatus according to claim 12, wherein the read data transmission unit includes one or more through-silicon vias.

17. The semiconductor apparatus according to claim 12, wherein the second chip comprises:
a second chip pad configured to output the first chip output data and second chip output data; and
a second chip read control unit configured to generate the second chip output data based on data stored in a memory cell of the second chip.

18. The semiconductor apparatus according to claim 17, wherein the second chip further comprises:
an output timing adjustment unit configured to allow time from a start time point of a read operation to an output time point of the first chip output data through the second chip pad to substantially coincide with time from the start time point of the read operation to an output time point of the second chip output data through the second chip pad.

19. The semiconductor apparatus according to claim 12, wherein the data received in the first chip read control unit is parallel data, and the first chip output data output from the first chip read control unit is parallel data.

* * * * *